(12) United States Patent
Baumann

(10) Patent No.: US 6,722,387 B2
(45) Date of Patent: Apr. 20, 2004

(54) SIDE MOUNTED VALVE OPERATOR

(75) Inventor: Hans D. Baumann, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 297 days.

(21) Appl. No.: 10/016,728

(22) Filed: Oct. 29, 2001

(65) Prior Publication Data

US 2003/0079779 A1 May 1, 2003

(51) Int. Cl.[7] .............................................. F16K 31/52
(52) U.S. Cl. ........................................ 137/270; 251/229
(58) Field of Search ................................ 137/270, 269; 251/231, 232, 228, 279, 229

(56) References Cited

U.S. PATENT DOCUMENTS 3,452,766 A * 7/1969 Fenster ........................ 251/229
4,149,561 A * 4/1979 Dalton ......................... 251/229
4,685,310 A   8/1987 Stegmann et al.
5,301,708 A * 4/1994 Schmidt ....................... 251/229
6,024,125 A   2/2000 Baumann

* cited by examiner

Primary Examiner—Kevin Lee
(74) Attorney, Agent, or Firm—Lahive & Cockfield, LLP; Anthony A. Laurentano; Sean D. Detweiler

(57) ABSTRACT

A valve operator is provided having a rotatable spindle extending along an axis. The rotatable spindle is rotatable about the axis. The rotatable spindle is additionally pivotable about a first pivot point. A pivotable linkage operably couples with the spindle. The pivotable linkage is pivotably movable about a second pivot point, such that rotation of the spindle moves the pivotable linkage in a pivoting motion about the second pivot point. Rotation of the spindle additionally pivotally moves the spindle about the first pivot point. The inventive valve operator has a fewer number of parts, a relatively low cost of manufacture, and a high operating efficiency relative to known valve operators.

25 Claims, 6 Drawing Sheets

Section A-A

Section B-B

SIDE MOUNTED VALVE OPERATOR

FIELD OF THE INVENTION

The present invention relates to control valves, and more particularly to a valve operator for manually operating a control valve.

BACKGROUND OF THE INVENTION

Flow control valves, including plug valves, are used in a number of different applications. Some guiding principles in designing and implementing control valves include the desire to employ a simple and efficient valve and operator having a relatively low number of parts, with the assembled valve being cost effective, efficient, and reliable in operation.

Current implementations of control valves often utilize an automated actuator to actuate the control valve. The automated actuator can have a pneumatic or electric source of power.

The possibility of the control valve actuator failing at some point during its lifetime varies with each control valve. Because the possibility exists, it is desirable in many instances to provide a manual backup valve operator, or an auxiliary valve operator, to duplicate the function of the automated valve actuator during a failure. The valve operator can also be used in instances where the automated valve actuator is properly functioning, and for other reasons (such as manual override), it is desirable to have the ability to open and close a control valve without using the actuator.

SUMMARY OF THE INVENTION

There is a need in the art for a valve operator having a fewer number of parts, a relatively low manufacturing cost, and a high operating efficiency relative to known valve operators in use today. The present invention is directed toward further solutions to address this need.

In accordance with one example embodiment of the present invention, a valve operator includes a rotatable spindle extending along an axis. The rotatable spindle is rotatable about the axis. The rotatable spindle is additionally pivotable about a first pivot point. A pivotable linkage operably couples with the spindle. The pivotable linkage is pivotably movable about a second pivot point, such that rotation of the spindle about the axis moves the pivotable linkage in a pivoting motion about the second pivot point. Rotation of the spindle can additionally pivotally move the spindle about the first pivot point.

The valve operator can be mounted in combination with an automated valve actuator on the same control valve. The automated valve actuator can have a number of different power sources, including pneumatic and electronic.

In accordance with one aspect of the present invention, a bearing forms the first pivot point. A reaction force from the pivotable linkage can push a first end of the spindle against the bearing. A structure fixed to a yoke of an actuator coupled to the valve operator supports the bearing.

According to another aspect of the present invention, a support bracket for supporting the pivotable linkage is fixed to a yoke of the actuator. The support bracket includes a first bracket arm and a second bracket arm. Each of the first and second bracket arms can extend to the second pivot point from the yoke of the actuator.

In accordance with further embodiments of the present invention, the pivotable linkage generally forms about a 90° angle between each of first and second ends and the pivot point. Alternatively, the pivotable linkage can form greater than or less than about a 90° angle between each of first and second ends and the second pivot point.

In accordance with still another aspect of the present invention, a pivot pin extending through a pivot bore within the pivotable linkage forms the second pivot point. In addition, a threaded fixture operably coupling the rotatable spindle with the pivotable linkage mounts within a bore of a first end of the pivotable linkage. A bearing mounted within the bore supports the threaded fixture. The threaded fixture can take the form of a nut, in addition to other structures.

In accordance with still further aspects of the present invention, the threaded fixture rotatably mounts in a manner enabling the rotation of the threaded fixture about a rotation axis perpendicular to the axis of the threaded spindle and parallel to a rotation axis of the second pivot point. This arrangement allows the threaded fixture to be pivotable about the first pivot point, wherein the first pivot point is distal from the threaded fixture.

In accordance with still another aspect of the present invention, a second end of the pivotable linkage extends to couple with a stem. The stem can be an actuator stem or a valve stem. The actuator stem and valve stem can likewise couple together.

In accordance with still another aspect of the present invention, a rounded tip is disposed at a first end of the threaded spindle. The rounded tip facilitates the pivoting and rotating movements of the threaded spindle.

In accordance with still another aspect of the present invention, a wheel is disposed at a second end of the threaded spindle for actuating a rotation force on the threaded spindle.

In accordance with yet another embodiment of the present invention, a pivotable lock nut is disposed to receive the threaded spindle. The lock nut is disposed to lock the threaded spindle to prevent rotation.

In accordance with still another embodiment of the present invention, a valve operator is provided having a rotatable threaded spindle. The spindle extends along an axis and is rotatable thereabout. The spindle is pivotable about a first pivot point. A pivotable linkage having a first end, a second end, and a second pivot point is also provided. A bore extends at least partially through the first end of the linkage. A threaded fixture rotatably mounts at the bore for receiving the threaded spindle. The threaded fixture is rotatable about an axis parallel to an axis of the second pivot point. The second end of the pivotable linkage couples to a stem, such that rotation of the spindle causes the linkage to pivot about the second pivot point to effect movement of the stem.

In accordance with another embodiment of the present invention, a system is provided for actuating a valve. The system includes an automated valve actuator. In addition, a valve operator is provided. The valve operator includes a rotatable spindle having a first end, a second end, and a center line axis extending therebetween. The first end rotatably couples to a bearing and the spindle is pivotable about a first pivot point at the bearing. A pivotable linkage having a first end, a second end, and second pivot point therebetween, is also provided. The first end supports a rotatable threaded fixture that receives the rotatable spindle, and the second end extends to communicate with a stem.

The present invention provides a side mounted valve operator. The assembly of the valve operator can be configured so that the pivotable linkage in one mode can push a valve stem downward, and in another mode the assembly can be inverted so the operator pushes a valve stem upward. No additional parts are required between each of the two modes.

Furthermore, the present invention provides for a mechanism using manually induced motion and lifting forces applied to valve and actuator stems at a greatly increased mechanical efficiency over known art, and using a reduced number of bearings. Known manual valve operators have at least one additional bearing within the operator mechanism relative to the operator of the present invention.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
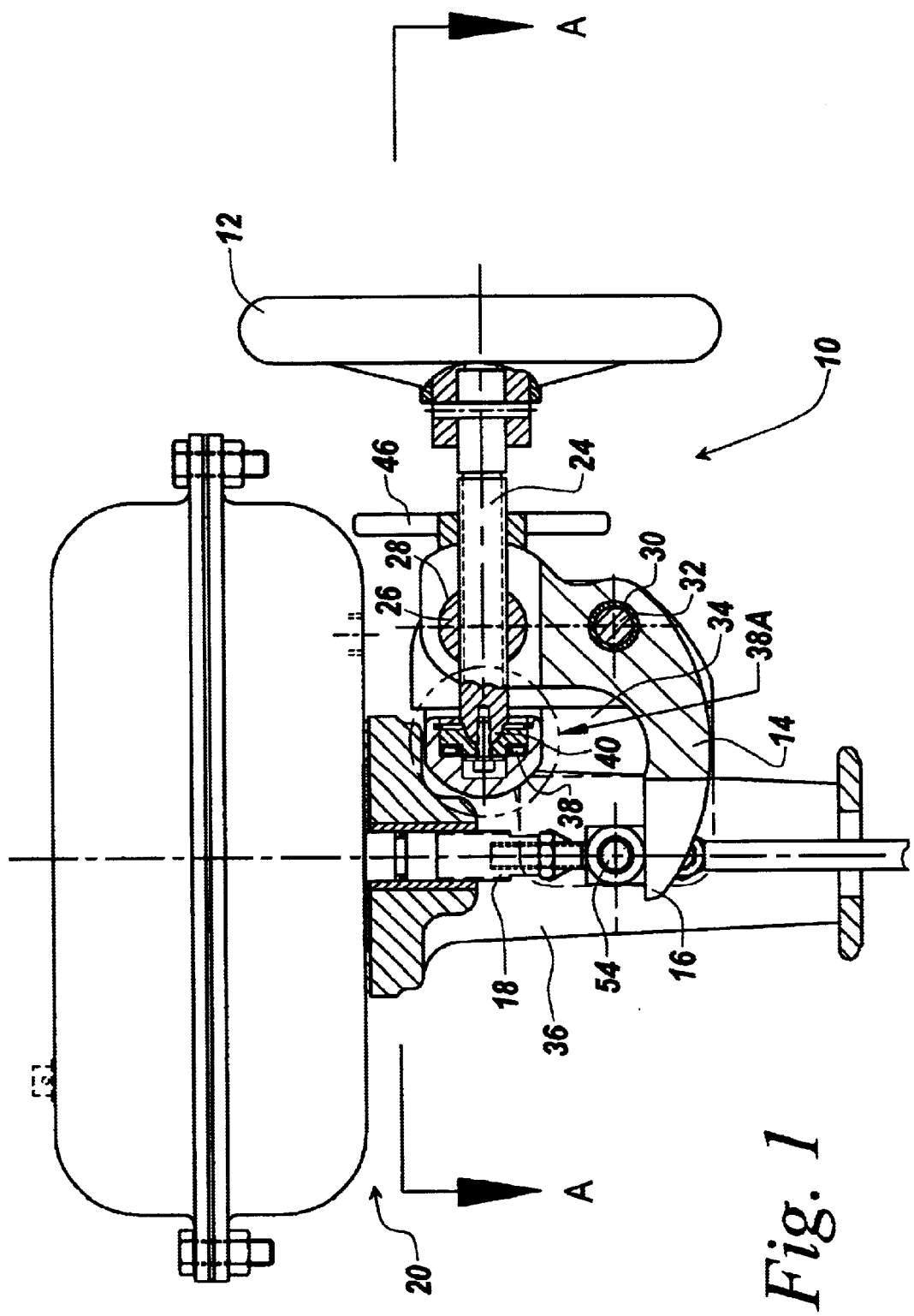
FIG. 1 is a diagrammatic cross-sectional view of a valve operator in combination with a valve actuator capable of moving an actuator stem in an upward motion according to the teachings of the present invention.

An illustrative embodiment of the present invention relates to a valve operator for use with a control valve. The valve operator includes a handwheel attached to a rotatable and pivotable threaded spindle. The threaded spindle pivots about a first pivot point. Rotation of the handwheel causes a motivated linkage having an extended link portion to pivot about a second pivot point and push against the stem of an actuator. The direction of motion is typically against a spring force from an actuator spring.

The threaded spindle engages a nut, which can rotate in a bore within the motivated linkage. A second bore retains a pivot pin, which is further engaged in a support structure, to form the second pivot point. The support structure fastens to a yoke of the actuator. The reaction force applied to the threaded spindle as a result of the turning of the handwheel is absorbed by a needle-bearing, which is supported within a portion of the structure.

The nut moves along the spindle and makes a radial excursion around the second pivot point as the threaded spindle rotates and pivots. A spherical tip on the end of the spindle, which seats in the bearing, facilitates the pivotal movement in addition to the rotational movement.

The components of the valve operator can be inverted to push a valve stem downward rather than pushing the valve stem upward. The overall operator design utilizes a reduced number of parts, thereby reducing the overall cost. The components of the operator are reversible without the use of additional parts, and the low friction of the pivoted and rotating spindle unit, together with a lower number of bearings, provides a high operating efficiency.

FIGS. 1 through 6C, wherein like parts are designated by like reference numerals throughout, illustrate example embodiments of a valve operator according to the teachings of the present invention. Although the present invention will be described with reference to the example embodiments illustrated in the figures, it should be understood that many alternative forms can embody the present invention. One of ordinary skill in the art will additionally appreciate different ways to alter one or more parameters of the embodiments disclosed, such as the size, shape, or type of elements or materials, in a manner still in keeping with the spirit and scope of the present invention.

FIG. 1 is a diagrammatic cross-sectional view of a valve operator 10 in accordance with one embodiment of the present invention. A force generator or handwheel 12 is provided for applying a rotational force to a threaded spindle 24. The invention is not limited to the handwheel 12 for providing the rotational force to the threaded spindle 24. Alternative mechanisms such as differently shaped levers, an additional automated actuator, a belt and pulley system, or the like, that can generate the requisite rotational force, can be used instead of the illustrated handwheel 12.

The threaded spindle 24 couples to a motivated linkage 14 by way of a rotatable nut 26. The nut 26 rotatably mounts within a first bore 28 of the motivated linkage 14. Internal threads of the nut 26 engage with the threads of the threaded spindle 24. The rotatable nut 26 can take the form of a number of different structures having a threaded internal passage for receiving the threaded spindle 24 and a fitting, or able to be coupled with a fitting, for rotatable mounting within the first bore 28, as understood by one of ordinary skill in the art.

The motivated linkage 14 further includes a second bore 30 having a pivot pin 32 passing therethrough. The motivated linkage 14 also includes an extended link 16 that couples with an actuator stem 18 of an actuator 20. The extended link 16 can couple with the actuator stem 18 in a number of different ways, such as by using different fastening devices, pins, bearings, fixtures, or simply pressing against the actuator stem 18 when applying a force thereon. The actuator stem 18 can connect with a valve stem 22 to enable the motivated linkage 14 to effect movement of the valve stem 22 as later described herein.

A support structure 34 connected to an actuator yoke 36 supports the valve operator 10. The support structure 34 can be fixedly attached to the actuator yoke 36 by a number of different fastening methods, including adhesive, welding, riveting, clamping, bolting, screwing, or the like. The support structure 34 is able to withstand the weight of the valve operator 10 assembly, as well as the reaction forces generated by the operator 10 as the threaded spindle 24 pushes against a needle bearing 38, and as the motivated linkage 14 moves the actuator stem 18.

The threaded spindle 24 includes a generally spherical tip 40, which mounts in the needle-bearing assembly 38A supported by the support structure 34. The spherical tip 40 of the threaded spindle 24 allows for either or both rotational and pivotal motion of the threaded spindle 24.

A lock nut 46, couples to a spherical portion of the motivated linkage 14, and serves to prevent movement of the threaded spindle 24 when not in use. The lock nut 46 has an internal thread that engages with the thread of the threaded spindle 24. The lock nut 46 additionally has a perimeter profile that matches the perimeter profile of the motivated linkage 14, such that the lock nut 46 can slide along the perimeter edge of the motivated linkage 14 when not in a locked position. If a user desires to lock the threaded spindle 24 in a particular arrangement, the user rotates the lock nut 46 to compress the lock nut 46 against the perimeter edge of the motivated linkage 14, which prevents rotational and pivotal movement of the threaded spindle 24 as well as pivotal movement of the motivated linkage 14.

Figure 2:
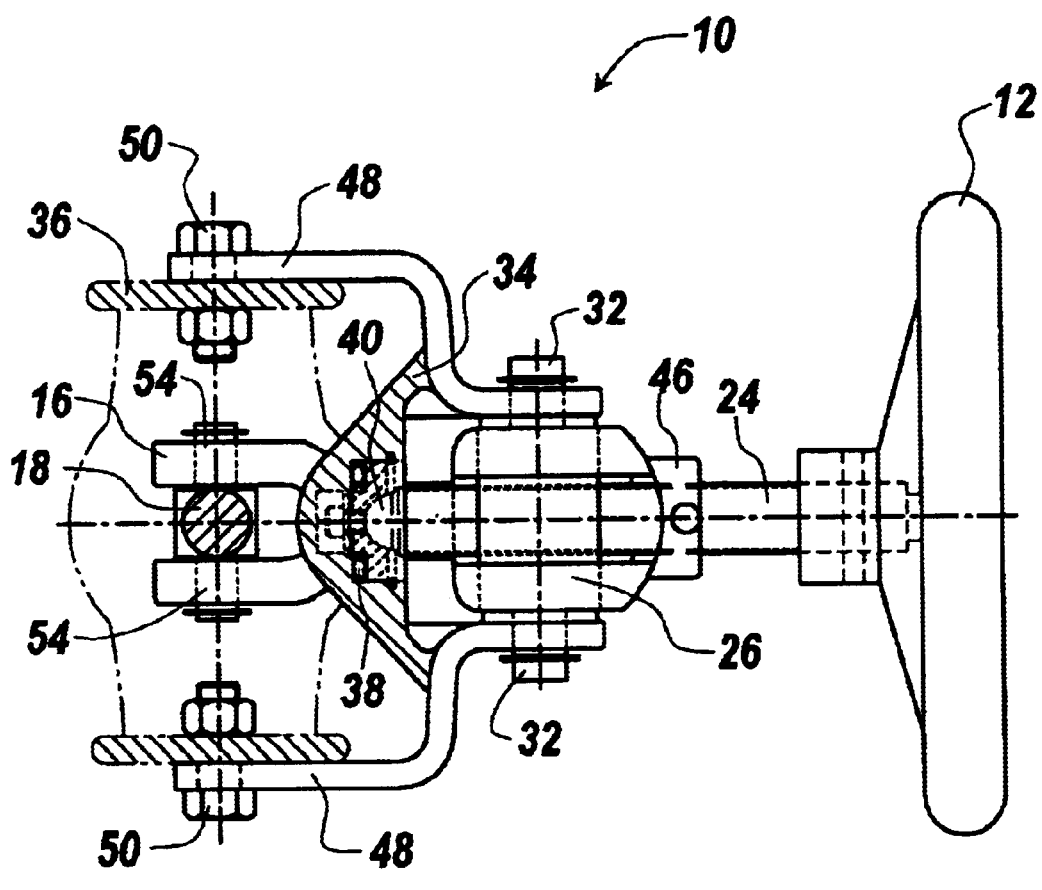
FIG. 2 is a cross-sectional view taken at section A—A of FIG. 1 according to the teachings of the present invention.

FIG. 2 is a cross-sectional illustration of the valve operator 10 taken along section A—A of FIG. 1. The support structure 34 of FIG. 1 supports the threaded spindle 24 and the nut 26. The support bracket 34 includes a pair of arms 48 extending from the actuator yoke 36. However, the support bracket 34 can have a number of different configurations extending between the actuator yoke 36 and the nut 26. For example, the support bracket 34 can have a different number, and differently shaped, arms 48 where the arms can be relatively straight, curved, angled, or the like. The arms can be solid, or can contain a series of openings to reduce the weight of the support bracket 34. Other support bracket configurations are possible as will be understood by one of ordinary skill in the art.

FIG. 2 also provides a cross-sectional top view of the coupling connection between the handwheel 12, the threaded spindle 24, and the nut 26. As can be seen, the threaded spindle 24 passes through the nut 26 and terminates at the needle-bearing 38 in the form of the spherical tip 40. The needle-bearing 38 receives the spherical tip 40 in a seat and allows for the rotation and pivoting of the threaded spindle 24. Also visible in this view is the pivot pin 32.

The support bracket 34 mounts to the actuator yoke 36 and is affixed thereto with bolts 50, which hold the support bracket 34 fixedly in place. The support bracket 34 can mount in a number of additional ways, including adhesive, welding, riveting, or the like.

FIG. 2 also illustrates the extended link 16 being coupled with the actuator stem 18. A pair of pins 54 forms the connection between the extended links 16 and the actuator stem 18. However, one of ordinary skill in the art will understand that any number of different mechanical couplings can couple the extended link 16 of the motivated linkage 14 with the actuator stem 18.

Figure 3:
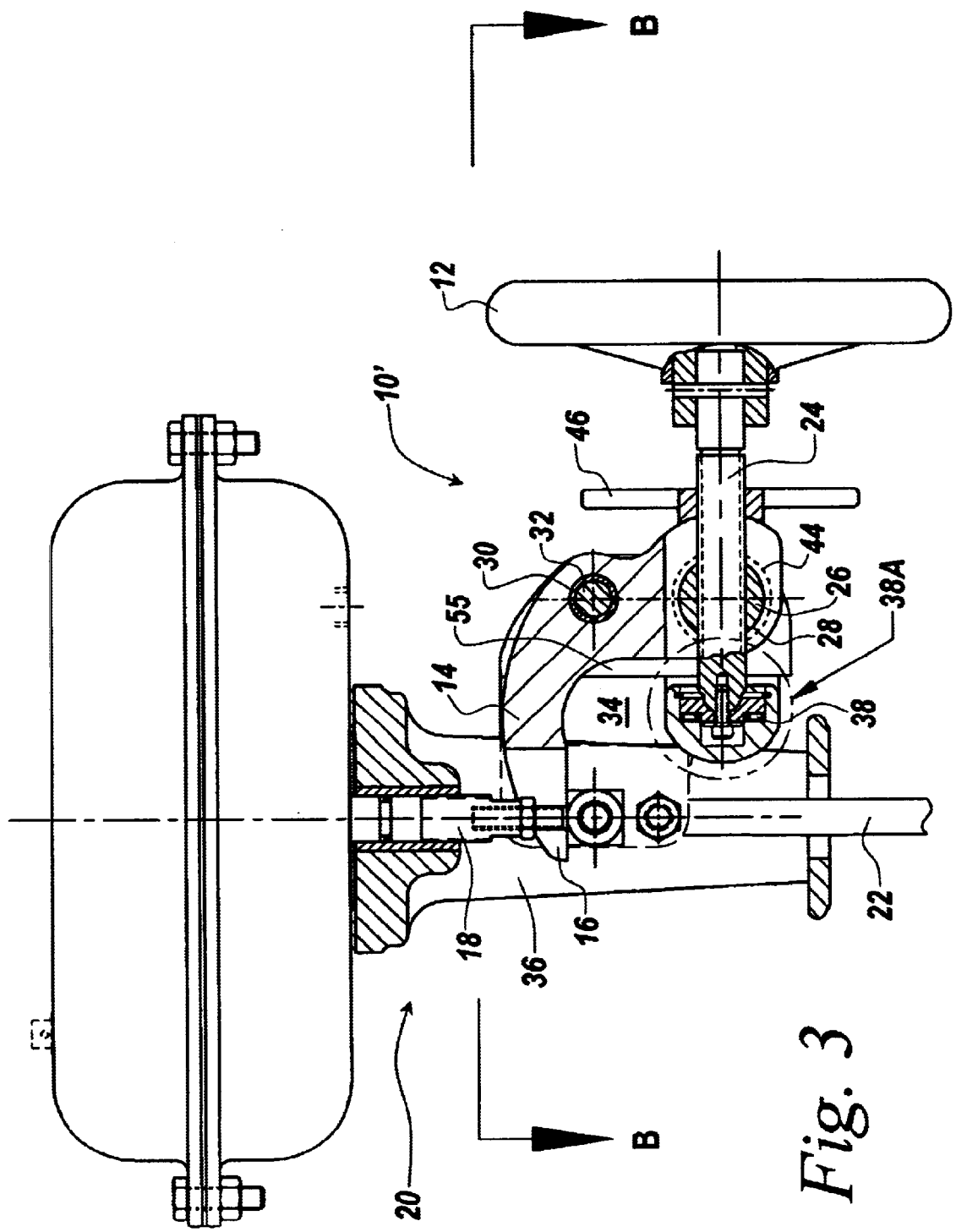
FIG. 3 is a diagrammatic cross-sectional view of a valve operator in combination with an actuator capable of moving an actuator stem in a downward motion according to the teachings of the present invention.

FIG. 3 illustrates an alternative embodiment of the valve operator 10' in accordance with the teachings of the present invention. Like parts are designated with like reference numerals. The embodiment illustrated is an inverted form of the embodiment shown in FIGS. 1 and 2. The handwheel 12 couples with the threaded spindle 24, which terminates in the spherical tip 40 seated within the needle-bearing 38. The threaded spindle passes through the nut 26, which mounts within the first bore 28 of the motivated linkage 14. Rotation of the handwheel 12 causes the motivated linkage 14 to travel along the length of the threaded spindle 24, while pivoting about a pivot point formed by the second bore 30 and the pivot pin 32.

Figure 4:
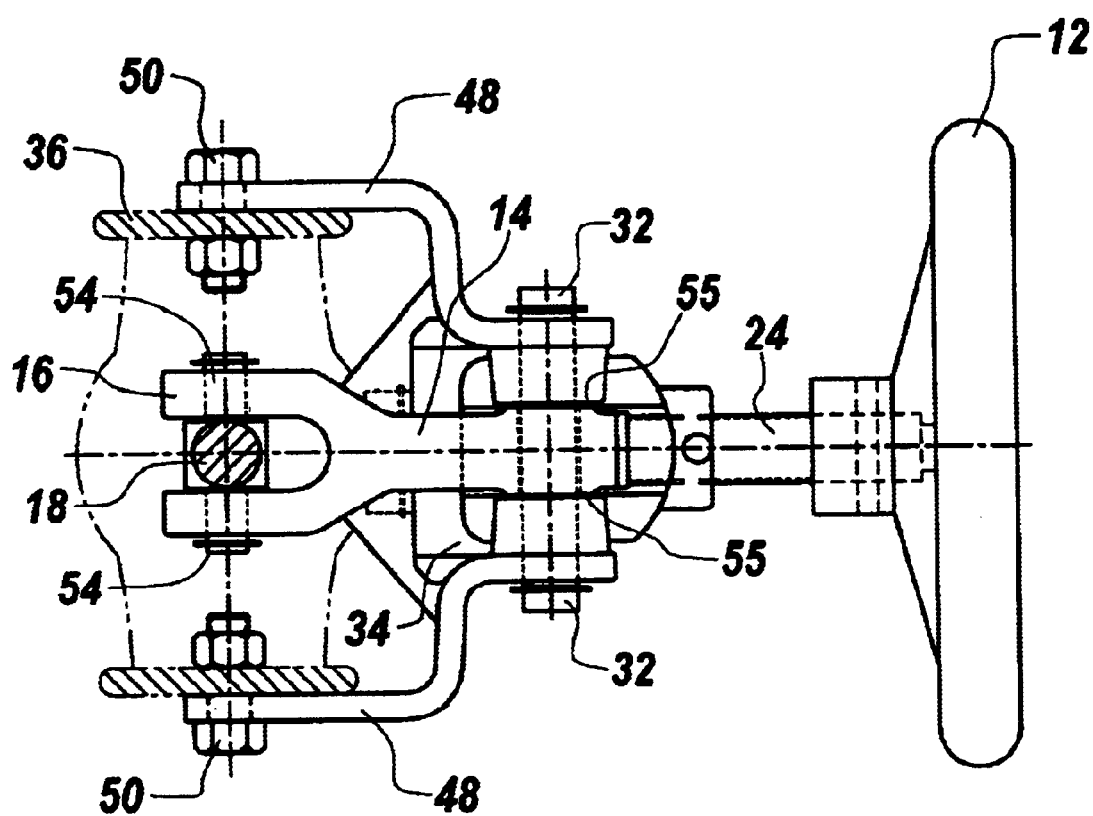
FIG. 4 is a cross-section at section B—B of FIG. 3 according to the teachings of the present invention.

FIG. 4 illustrates a cross-sectional view of the valve operator 10' taken at section B—B of FIG. 3. As illustrated herein, the handwheel 12 couples with the threaded spindle 24. The spindle 24 passes through the threaded nut 26. The support bracket 34 has a slotted portion 55 to receive the motivated linkage 14, and fixedly mounts to the yoke 36 of the actuator with the use of two bolts 50. The pins 32 pass through the slotted portion 55, allowing the motivated linkage 14 to rotate about the shared axis of the pins 32. In addition, the pins 54 couple the extended link 16 of the motivated linkage 14 to the actuator stem 18.

The valve operator 10 of FIGS. 1 and 2 pushes the actuator stem 18 upward with movement of the handwheel 12, while the arrangement valve operator 10' illustrated in FIG. 3 pushes the actuator stem 18 downward with rotation of the handwheel 12. Each component of the valve operator can be rearranged into the valve operator 10' configuration of FIG. 3 without requiring any modification to the actual components. The specific arrangement of operator components relates to the direction of the spring force on the actuator stem 18. If the actuator stem 18 experiences a constant spring force pushing the actuator stem 18 downward, the valve operator configuration of FIGS. 1 and 2 is appropriate. If the actuator stem 18 experiences a constant spring force pushing the actuator stem 18 upward, the valve operator configuration of FIG. 3 is appropriate. The direction of the spring force is determined as a specification of the particular valve construction, and typically makes use of a valve spring (not shown) surrounding the actuator stem 18, or the valve stem 22, as is understood by those of ordinary skill in the art.

Figure 5:
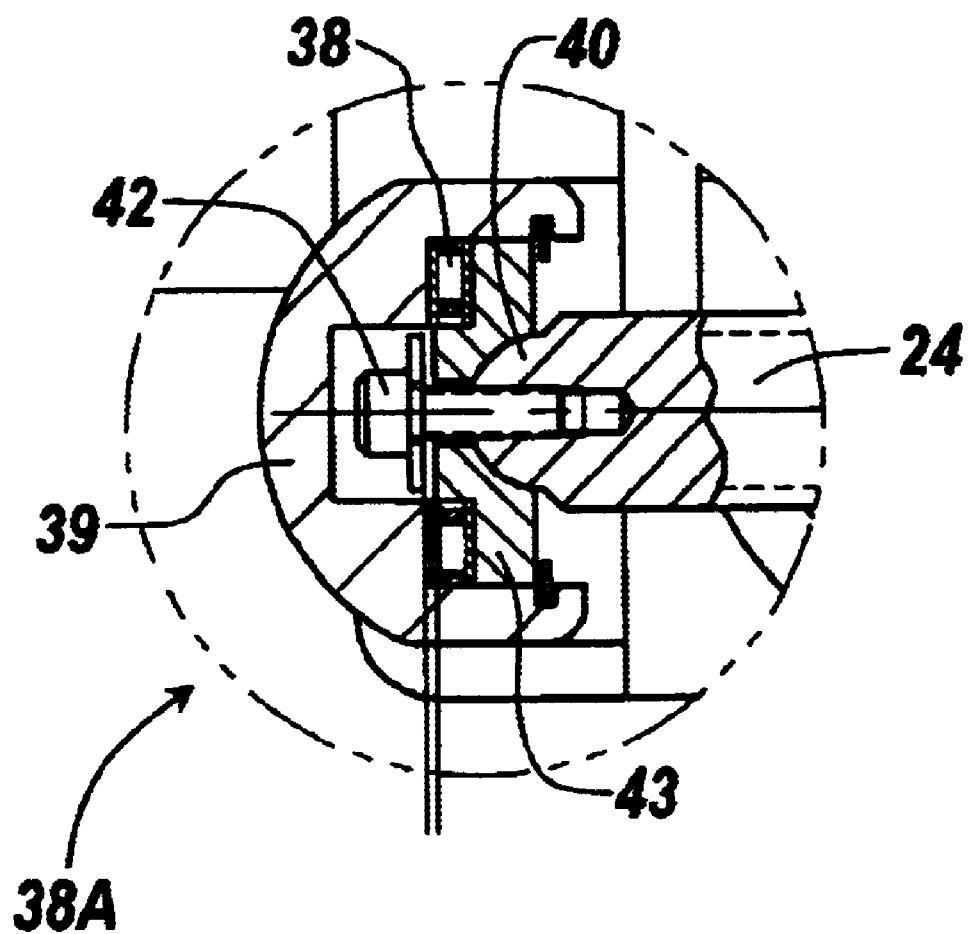
FIG. 5 is an enlarged diagrammatic illustration of a bearing according to the teachings of the present invention.

FIG. 5 illustrates a close-up of the needle bearing assembly 38A illustrated in FIGS. 1 and 3. The needle bearing assembly 38A includes a screw 42, which screws into the spherical tip 40 of the threaded spindle 24. The screw 42 holds the spherical tip 40 of the threaded spindle 24 in place during times at which the valve operator 10 is not connected to the actuator, and/or there is no force pressing the threaded spindle 24 against the needle-bearing 38, i.e., during shipping. The needle bearing 38 further receives a base 43 coupled with a cap 39 that is part of the support bracket 34. When the valve operator 10 is coupled with an actuator, the reaction force of a properly installed motivated linkage 14 pushes the spherical tip 40 of the threaded spindle 24 towards, or into base 43 and therefore compresses the bearing 38. Thus, there is no need for the screw 42 to withstand any pulling load from the threaded spindle 24.

Figure 6A:
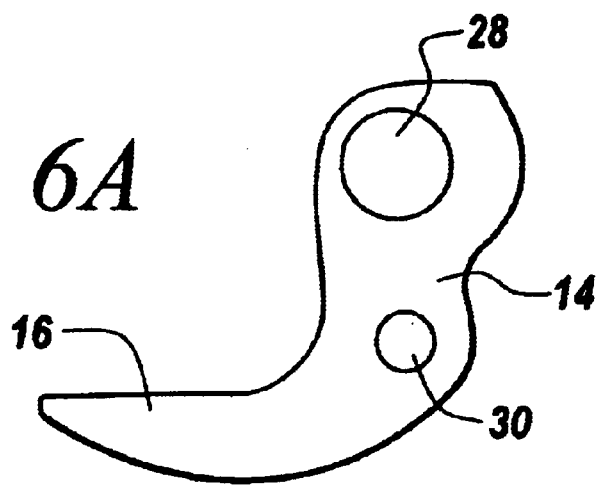
FIGS. 6A through 6C are diagrammatic illustrations of motivated linkages according to aspects of the present invention.
Figure 6B:
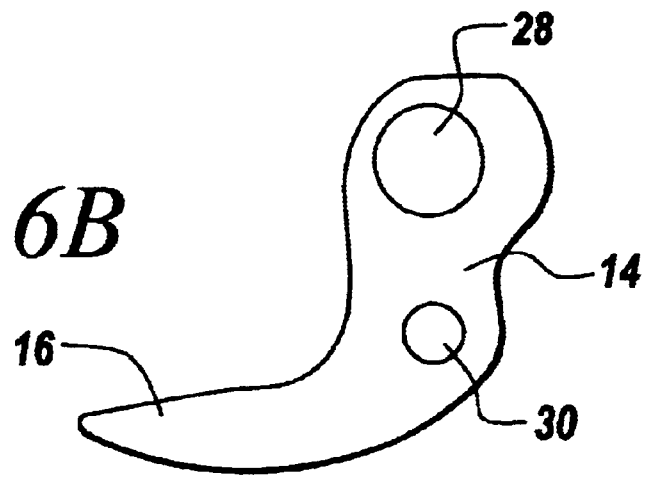
Figure 6C:
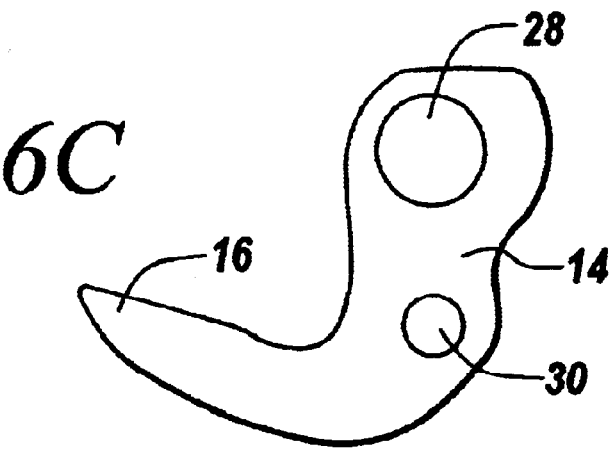

FIGS. 6A, 6B, and 6C illustrate several embodiments of the motivated linkage 14 in accordance with the teachings of the present invention. The illustrated linkage includes the first bore 28, the second bore 30, and the extended link 16. The angle between the extended link 16 to the second bore 30 and the second bore 30 up to the first bore 28 is approximately 90° in FIG. 6A. However, in FIG. 6B the angle is an obtuse angle (i.e., approximately greater than 90°), while the angle in FIG. 6C is an acute angle (i.e., less than approximately 90°). One of ordinary skill in the art will understand that varying the angle of the linkage will have different affects on the power and range of the motivated linkage 14. In addition, one of ordinary skill in the art will appreciate that the motivated linkage 14 can have a number of different shapes and angles in addition to those depicted herein. FIGS. 6A through 6C illustrate the underlying angular relationship possibilities between each end of the motivated linkage, regardless of the actual linkage shape.

In operation, the valve operator 10 works generally as follows in accordance with the teachings of the present invention. Referring to FIG. 1, a user rotates the handwheel 12 in either a clockwise or a counterclockwise direction, depending on the desired movement of the actuator stem 18. Rotation of the handwheel 12 rotates the threaded spindle 24 and causes the nut 26 to travel along the axis of the threaded spindle 24, and at the same time move along an arcuate path defined by the distance between the pin 32 and the bearing 26, where the axis of the pin 32 is the focal point. The movement of the nut 26 through the arcuate path in turn causes the axis of the spindle 24 to be angularly displaced. The angular displacement is enabled by a rotation about a pivot point at the spherical tip 40. Rotation of the handwheel 12 in one direction moves the nut 26 in one direction, and rotation in the other direction moves the nut 26 in the opposite direction. The nut 26 couples with the first bore 28 of the motivated linkage 14. Therefore, movement of the nut 26 results in movement of the motivated linkage 14. For example, if rotation of the handwheel 12 results in the nut 26 traveling in the direction toward the handwheel 12, the nut 26 moves the motivated linkage 14 in that direction.

The motivated linkage 14 is also pivotally mounted at the second bore 30 with the pivot pin 32 to form a first pivot point. The force generated by the nut 26 pivots the motivated linkage in a clockwise direction about the pivot pin 32. The clockwise rotational movement of the motivated linkage 14 causes the extended link 16 to push up against the actuator stem 18, vertically lifting the actuator stem 18 and the valve stem 22 coupled thereto. The vertical action of the actuator stem 18 opens or closes a valve. The valve is not illustrated for purposes of clarity. One of ordinary skill in the art will understand that a number of different valves can connect with the type of actuator illustrated herein, such as gate valves, plug valves, and needle valves.

When the manual valve operator 10 is not in use, and the automated actuator 20 is in use, the actuator 20 automatically lifts the actuator stem 18 off the extended link 16. Thus, the motivated linkage 14 does not interfere with automated movement of the actuator stem 18 and the corresponding movement of the valve stem 22 to open and close the valve. Locking the nut 46 can lock the motivated linkage 14 in place to prevent interference from the valve operator 10.

The valve operator 10 in the configuration depicted in FIG. 3 is useful for implementation with a valve actuator 20 having a spring normally pulling the actuator stem 18 in an upward direction. In such an arrangement, the actuator 20 and the motivated linkage 14 each push in a opposite, downward, direction on the actuator stem 18 to open and close the valve attached thereto.

Referring again to FIG. 1, as the motivated linkage 14 rotates in a clockwise direction, the motivated linkage 14 at the location of the first bore 28 and the nut 26 moves along an arcuate path. In order for such a path to occur, the threaded spindle 24 pivots about a pivot point generally located at the spherical tip 40. Therefore, as the motivated linkage 14 moves along the arcuate path, the threaded spindle 24 pivots downward to follow the path. The threaded spindle is provided with the spherical tip 40 to allow the pivotal movement to occur. Further, the nut 26 rotates within the first bore 28 to maintain alignment with the threaded spindle 24 and allow the threads to engage appropriately.

The lock nut 46 is additionally provided to lock the threaded spindle in place against the motivated linkage 14. To lock the operator in place, the lock nut is tightened, which results in a friction force between the lock nut and the edge of the motivated linkage 14. The friction fit prevents the pivotal movement of the threaded spindle 24, as well as the rotational movement of the threaded spindle 24. The lock nut 46 must be loosened and removed a sufficient distance from the motivated linkage 14 so as to not interfere during the normal operation and use in the range of movement of the motivated linkage 14.

The valve operator according to the teachings of the present invention offers a unique arrangement of linkages and a spindle to achieve a cost effective and efficient design for movement of a valve actuator and stem with a minimum amount of friction. The components of the valve operator are reversible, such that the same parts can be used in an upward force-generating configuration or a downward force-generating configuration by simply re-arranging individual components. Movement of the handwheel, or some other source of rotational force, causes the threaded spindle to rotate and slightly pivot as the motivated linkage moves to motivate the actuator stem and open or close the attached valve.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A valve operator, comprising:
   a rotatable spindle extending along an axis and rotatable thereabout, said spindle being pivotable about a first pivot point; and
   a pivotable linkage operably coupled with said spindle and pivotably movable about a second pivot point, such that rotation of said spindle pivotally moves said pivotable linkage about said second pivot point and pivotally moves said spindle about said first pivot point.

2. The valve operator of claim 1, further comprising an automated valve actuator coupled with said valve operator.

3. The valve operator of claim 1, further comprising a bearing assembly for rotatably and pivotally supporting said rotatable spindle.

4. The valve operator of claim 3, wherein said bearing assembly forms said first pivot point.

5. The valve operator of claim 2, further comprising a support bracket for supporting the pivotable linkage, said support bracket fixed to a yoke of said actuator.

6. The valve operator of claim 5, wherein said support bracket comprises a first bracket arm and a second bracket arm, each of said first and second bracket arms extending to said second pivot point from said yoke of said actuator.

7. The valve operator of claim 1, further comprising a pivot pin extending through a pivot bore within said pivotable linkage to form said second pivot point.

8. The valve operator of claim 1, further comprising a threaded fixture operably coupling said rotatable spindle with said pivotable linkage at said first end of said pivotable linkage.

9. The valve operator of claim 8, wherein said threaded fixture is rotatably mounted in a manner enabling the rotation of said threaded fixture about an axis perpendicular to said axis of said threaded spindle and parallel to an axis of said second pivot point.

10. The valve operator of claim 8, wherein said threaded fixture is pivotable about said first pivot point distal from said threaded fixture.

11. The valve operator of claim 2, wherein a second end of said pivotable linkage extends to couple with a stem of said actuator.

12. The valve operator of claim 1, further comprising a rounded tip disposed at a first end of said threaded spindle.

13. The valve operator of claim 1, further comprising a wheel disposed at a second end of said threaded spindle for actuating a rotation force on said threaded spindle.

14. The valve operator of claim 1, further comprising a pivotable lock nut disposed to receive said threaded spindle, said lock nut disposed to lock said threaded spindle to prevent rotation.

15. The valve operator of claim 1, wherein said rotatable spindle and said pivotable linkage are reversible, such that said resulting valve operator can be configured to push a stem in an upward direction or a downward direction, depending on the configuration.

16. The valve operator of claim 1, wherein said operator comprises only one bearing for rotatably and pivotably mounting said rotatable spindle.

17. A system for actuating a valve, comprising:
an automated valve actuator; and
a valve operator, said valve operator comprising:
a rotatable spindle having a first end, a second end, and a centerline axis extending therebetween, said first end being rotatably coupled to a bearing and said spindle being pivotable about a first pivot point at said bearing; and
a pivotable linkage having a first end, a second end, and a second pivot point therebetween, such that said first end supports a rotatable threaded fixture that receives said rotatable spindle and said second end extends to communicate with a stem.

18. The system of claim 17, further comprising a pivot pin extending through a pivot bore within said pivotable linkage to form said second pivot point.

19. The valve operator of claim 17, further comprising a fixture bore disposed within said first end of said pivotable linkage.

20. The valve operator of claim 17, further comprising a rounded tip disposed at said first end of said threaded spindle.

21. The valve operator of claim 17, wherein said threaded fixture is rotatably mounted in a manner enabling rotation of said threaded fixture about a rotation axis perpendicular to said centerline axis of said threaded spindle.

22. The valve operator of claim 17, wherein said threaded fixture is pivotable about said first pivot point distal from said threaded fixture.

23. The valve operator of claim 17, wherein said rotatable spindle and said pivotable linkage are reversible, such that said resulting valve operator can be configured to push said stem in an upward direction or a downward direction, depending on the configuration.

24. The valve operator of claim 17, wherein said operator comprises only one bearing for rotatably and pivotably mounting said rotatable spindle.

25. A valve operator, comprising:
a rotatable spindle extending along an axis and rotatable thereabout, said spindle being pivotable about a first pivot point; and
a pivotable linkage operably coupled with said spindle and pivotably movable about a second pivot point, such that rotation of said spindle pivotally moves said pivotable linkage about said second pivot point and pivotally moves said spindle about said first pivot point;
wherein said rotatable spindle and said pivotable linkage are reversible, such that said resulting valve operator can be configured to push a stem in an upward direction or a downward direction, depending on the configuration.

* * * * *